US010579888B2

(12) United States Patent
Samii et al.

(10) Patent No.: US 10,579,888 B2
(45) Date of Patent: Mar. 3, 2020

(54) METHOD AND SYSTEM FOR IMPROVING OBJECT DETECTION AND OBJECT CLASSIFICATION

(71) Applicant: GM GLOBAL TECHNOLOGY OPERATIONS LLC, Detroit, MI (US)

(72) Inventors: Soheil Samii, Troy, MI (US); Unmesh Dutta Bordoloi, Troy, MI (US); Fan Bai, Ann Arbor, MI (US); Guangyu J. Zou, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 108 days.

(21) Appl. No.: 15/979,869

(22) Filed: May 15, 2018

(65) Prior Publication Data
US 2019/0354785 A1 Nov. 21, 2019

(51) Int. Cl.
*A61B 5/18* (2006.01)
*G06K 9/00* (2006.01)
*G06N 5/04* (2006.01)
*G06K 9/32* (2006.01)
*G08G 1/01* (2006.01)

(52) U.S. Cl.
CPC ..... *G06K 9/00825* (2013.01); *G06K 9/00805* (2013.01); *G06K 9/3233* (2013.01); *G06N 5/046* (2013.01)

(58) Field of Classification Search
CPC .................................. H04N 1/00; G06Q 20/00
USPC ........................................................ 382/104
See application file for complete search history.

(56) References Cited

U.S. PATENT DOCUMENTS 8,054,203 B2 * 11/2011 Breed ..................... B60C 11/24
340/931

* cited by examiner

*Primary Examiner* — Abolfazl Tabatabai
(74) *Attorney, Agent, or Firm* — Cantor Colburn LLP

(57) ABSTRACT

A system and method for object detection and classification includes receiving by a controller a first data of a scene, wherein the data reflects the scene at a first time, and performing a first classification of at least one object within the scene based on the data. The method includes determining a projected location of the at least one object corresponding to an estimated location at a second time. The method includes receiving a second data of the scene reflecting the scene at the second time. The method includes determining whether the projected location of the object corresponds to the location of the object as reflected by the second data. The method includes determining whether performing a second classification of the object is necessary based on the determination of whether the projected location corresponds to the location of the object reflected by the second data.

20 Claims, 4 Drawing Sheets

METHOD AND SYSTEM FOR IMPROVING OBJECT DETECTION AND OBJECT CLASSIFICATION

INTRODUCTION

The subject embodiments relate to improving object detection and object classification. Specifically, one or more embodiments can be directed to improving an autonomous vehicle's ability to perform object detection and object classification, for example.

An autonomous vehicle is generally considered to be a vehicle that is able to navigate through an environment without being directly guided by a human driver. The autonomous vehicle can use different methods to sense different aspects of the environment. For example, the autonomous vehicle can use global positioning system (GPS) technology, radar technology, laser technology, and/or camera/imaging technology to detect the road, other vehicles, and road obstacles. Autonomous vehicles need to accurately detect surrounding objects and need to accurately classify the detected objects.

SUMMARY

In one exemplary embodiment, a method includes receiving, by a controller of an autonomous vehicle, a first data of a scene. The first data reflects the scene at a first time. The method also includes performing a first classification of at least one object within the scene based on the received first data. The method also includes determining a projected location of the at least one object. The projected location corresponds to an estimated location at a second time. The method also includes receiving a second data of the scene. The second data reflects the scene at the second time. The method also includes determining whether the projected location of the at least one object corresponds to the location of the at least one object as reflected by the second data. The method also includes determining whether performing of a second classification of the at least one object is necessary based on the determination of whether the projected location corresponds to the location of the at least one object as reflected by the second data.

In another exemplary embodiment, the performing of the second classification of the at least one object is not necessary if the projected location corresponds to the location of the at least one object as reflected by the second data.

In another exemplary embodiment, the method also includes determining attribute data for the at least one classified object.

In another exemplary embodiment, determining the projected location of the at least one object includes determining the projected location based on the attribute data.

In another exemplary embodiment, the attribute data includes a heading and a speed of the object.

In another exemplary embodiment, performing the first classification of the at least one object includes determining a region of interest within the received first data.

In another exemplary embodiment, receiving the first data includes receiving video information or camera information of the scene.

In another exemplary embodiment, performing the first classification includes performing the first classification by a convolutional neural network.

In another exemplary embodiment, the method also includes determining whether a new object has entered the scene.

In another exemplary embodiment, the method also includes determining that additional classification is necessary based on the determination of whether a new object has entered the scene.

In another exemplary embodiment, a system within an autonomous vehicle includes an electronic controller of the vehicle configured to receive a first data of a scene. The first data reflects the scene at a first time. The electronic controller is also configured to perform a first classification of at least one object within the scene based on the received first data. The electronic controller is also configured to determine a projected location of the at least one object. The projected location corresponds to an estimated location at a second time. The electronic controller is also configured to receive a second data of the scene. The second data reflects the scene at the second time. The electronic controller is also configured to determine whether the projected location of the at least one object corresponds to the location of the at least one object as reflected by the second data. The electronic controller is also configured to determine whether performing of a second classification of the at least one object is necessary based on the determination of whether the projected location corresponds to the location of the at least one object as reflected by the second data.

In another exemplary embodiment, the performing of the second classification of the at least one object is not necessary if the projected location corresponds to the location of the at least one object as reflected by the second data.

In another exemplary embodiment, the electronic controller is further configured to determine attribute data for the at least one classified object.

In another exemplary embodiment, determining the projected location of the at least one object includes determining the projected location based on the attribute data.

In another exemplary embodiment, the attribute data includes a heading and a speed of the object.

In another exemplary embodiment, performing the first classification of the at least one object includes determining a region of interest within the received first data.

In another exemplary embodiment, receiving the first data includes receiving video information or camera information of the scene.

In another exemplary embodiment, performing the first classification includes performing the first classification by a convolutional neural network.

In another exemplary embodiment, the electronic controller is further configured to determine whether a new object has entered the scene.

In another exemplary embodiment, the electronic controller is further configured to determine that additional classification is necessary based on the determination of whether a new object has entered the scene.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

One or more embodiments are directed to a system and method for improving object detection and object classification. Conventional approaches of detecting objects and classifying objects typically use computationally-intensive, computer-vision processes. Specifically, the conventional approaches generally receive imagery of a scene and process the received imagery at a high frequency. The conventional approaches then process the received imagery of the scene in order to detect and classify objects that appear within the imagery.

However, after the conventional approaches detect/classify a set of objects within the scene, the conventional approaches continually perform the same process of detecting/classifying on the same set of objects. The conventional approaches thus continually perform the same process of detecting/classifying on the same set of objects at a high frequency even though the objects were previously detected/classified.

In contrast to the conventional approaches, one or more embodiments can reduce the amount of redundant detecting/classifying of objects by projecting and estimating future results based on current computing results, past computing results, and the dynamics of the set of objects. The dynamics of an object can include a heading and/or a speed of the object, for example. As such, one or more embodiments can reduce the complexity of the conventional approaches of using computer vision to detect and to classify objects within the scene. Instead of continually repeating the same process of detecting/classifying the same set of objects, one or more embodiments only need to perform a validating process once the objects are already detected. The validation process can be executed as a background task by an electronic control unit (ECU), or the validation process can be executed by using cloud computing.

By reducing the need to detect and to classify objects which have already been detected/classified, one or more embodiments can reduce a latency that is typically associated with performing object detection. One or more embodiments can reduce an amount of real-time computing that is needed to be performed on-board a vehicle, and thus one or more embodiments can enabling certain computing to be performed using cloud computing.

Figure 1:
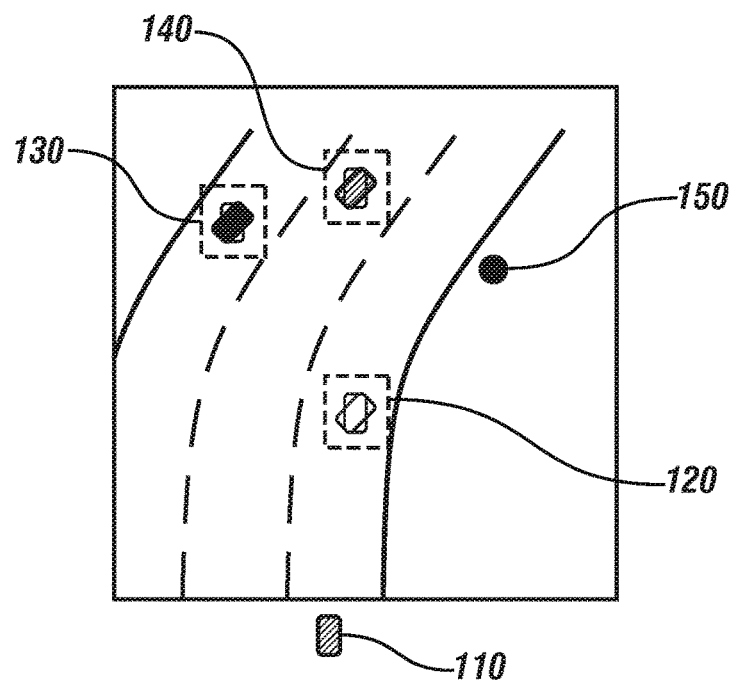
FIG. 1 illustrates performing object detection and object classification in accordance with a conventional approach.

FIG. 1 illustrates performing object detection and object classification in accordance with a conventional approach. With the conventional approaches, a detecting vehicle 110 will detect regions of interest 120, 130, 140, and 150 that correspond to surrounding objects. Upon detecting regions of interest 120, 130, 140, and 150, the detecting vehicle 110 will then classify the regions of interest 120, 130, and 140 as corresponding to surrounding vehicles. The detecting vehicle 110 will also classify region 150 as a stationary object. As detecting vehicle 110 continuously receives sensor information and camera information relating to the surrounding objects at a receiving frequency, detecting vehicle 110 will continuously re-detect and re-classify the objects of regions of interest 120-150, even though the objects were already correctly detected and correctly classified at an earlier time. As previously described, because the systems of the conventional approaches continuously re-detect and re-classify the objects (of the regions of interest) that were already correctly detected/classified earlier, the conventional approaches can expend a great deal of computer processing on redundant re-detection and re-classification.

Figure 2:
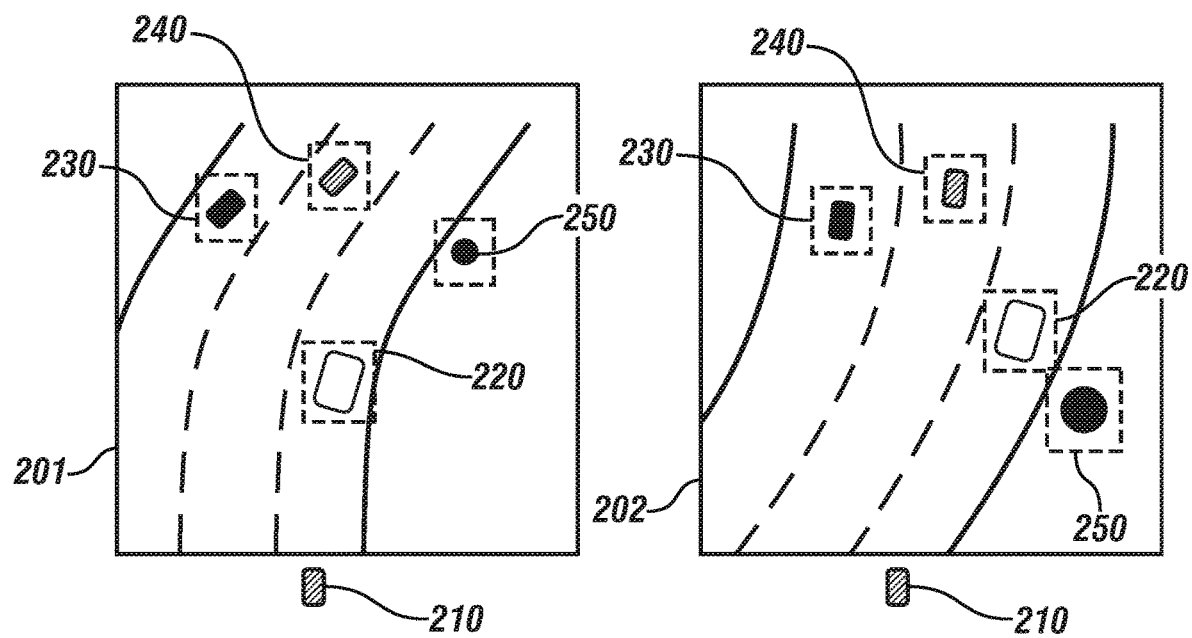
FIG. 2 illustrates performing object detection and object classification in accordance with one or more embodiments.

FIG. 2 illustrates performing object detection and object classification in accordance with one or more embodiments. With one or more embodiments, a detecting vehicle 210 receives sensor information and/or camera information relating to a current scene 201 at a current time. The detecting vehicle 210 can use the received information to determine regions of interest that correspond to objects within the current scene 201. Specifically, the detecting vehicle 210 receives information relating to objects of regions of interest 220, 230, 240, and 250. The received sensor information and/or camera information relate to information of the current scene 201. Based on the received information, detecting vehicle 210 can detect regions of interest 220-250, and detecting vehicle 210 can classify regions 220-240 as corresponding to vehicles and can classify region of interest 250 as corresponding to a stationary object.

In addition to detecting and classifying the objects of the current scene 201, one or more embodiments also determine attribute/dynamic information of each object. For example, the system of one or more embodiments can determine a speed and/or a velocity of each object. The system of one or more embodiments can also determine a relative speed and/or a relative velocity compared to the detected vehicle 210. In the example of FIG. 2, detecting vehicle 210 determines that the vehicle corresponding to region 230 is travelling at the same speed as the detecting vehicle 210. As such, the vehicle corresponding to region 230 is travelling at a 0 km/hr relative speed. Detecting vehicle 210 determines that the vehicle corresponding to region 240 is also travelling at a 0 km/hr relative speed. Detecting vehicle 210 determines that the stationary object corresponding to region 250 is travelling at a negative relative speed compared to detecting vehicle 210. One or more embodiments can also estimate a heading of one or more vehicles based on a curvature of the road, as reflected by at least one or more lane-level high-definition maps. One or more embodiments can also estimate a relative speed of other vehicles based on an inputted radar/Light-Detection-and-Ranging data (and inputted sensor data). One or more embodiments can also estimate a relative speed of other vehicles based on an amount of change in a region of interest from one captured image to another image.

After detecting and classifying the objects of a scene, and after determining the attribute/dynamic information of each object, the system of one or more embodiments can use the attribute/dynamic information regarding each of the objects to determine projected positions of the objects. One or more embodiments can also determine a projected scaled size for each of the regions. With one or more embodiments, the projected position and the projected scale of each region of interest can correspond to a position and scale that is predicted to occur in the future. For example, the projected position/scale can be a predicted position/scale that will occur when a camera (that captures the imagery) moves forward by 10 meters.

Referring again to the example of FIG. 2, the system of one or more embodiments can determine a projected scene 202 based on the detected/classified objects and based on the determined attribute information of each object. The projected scene 202 can correspond to a projected future scene of current scene 201. For example, projected scene 202 can correspond to a future scene where host vehicle 201 has advanced 10 meters in distance, in comparison to the current scene 201.

Referring to projected scene 202, the vehicle corresponding to region 230 (which is travelling at a 0 km/hr speed relative to detecting vehicle 210) is estimated to be at a same distance ahead of detecting vehicle 210. In other words, the estimated distance between the vehicle corresponding to region 230 and detecting vehicle 210 (as reflected by projected scene 202) is the same as the distance between the vehicle corresponding to region 230 and vehicle 210 (as reflected by current scene 201). The vehicle corresponding to region 240 (which is also travelling at a 0 km/hr relative speed) is also projected at a same distance ahead of detecting vehicle 210. The vehicle corresponding to region 220 (which is travelling at a +10 km/hr speed relative to detecting vehicle 210) is projected at a further distance ahead of detecting vehicle 210. In other words, as reflected within projected scene 202, the vehicle corresponding to region 220 has increased the distance between itself and detecting vehicle 210. Referring to projected scene 202, the stationary object corresponding to region 250 has become about 10 meters closer to detecting vehicle 210.

Figure 3:
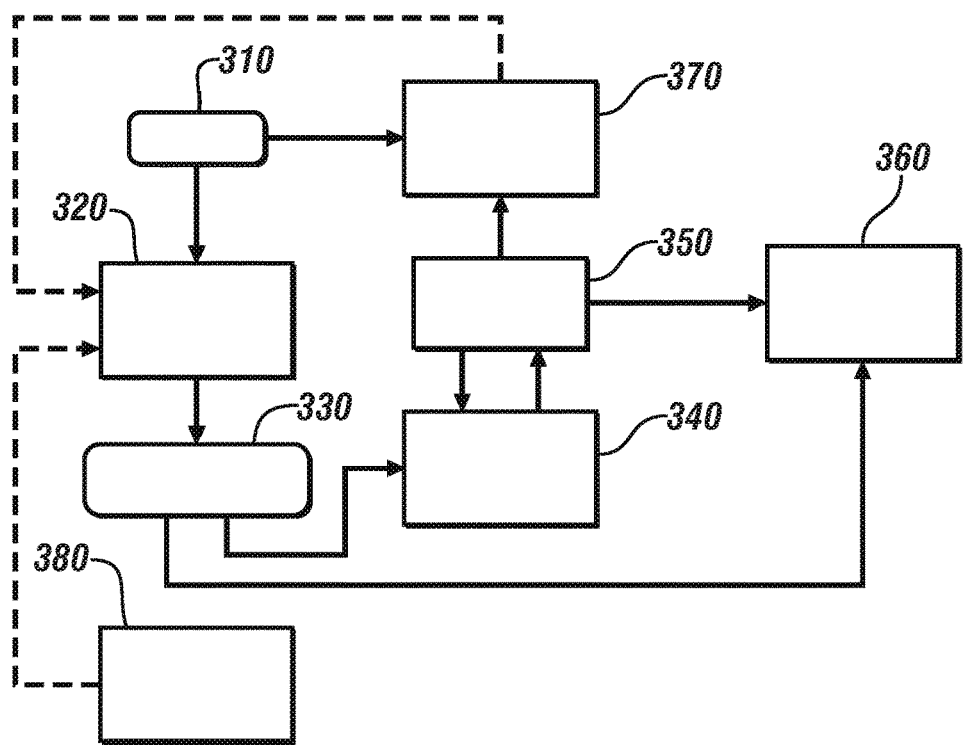
FIG. 3 illustrates a system for performing projection, validation, and change detection in accordance with one or more embodiments.

FIG. 3 illustrates a system for performing projection, validation, and change detection in accordance with one or more embodiments. Imagery/sensory data 310 (of the current scene) can be input into a processor 320 such as, for example, a convoluted neural network processor. Based on the inputted imagery/sensory data 310, an object detection/classification device of the convoluted neural network processor 320 can detect one or more regions of interest. The object detection/classification device can also use the inputted imagery/sensory data 310 to classify each detected region of interest. As such, the convoluted neural network processor 320 can determine a list of objects and corresponding attributes 330 (i.e., a speed and/or a heading of each object, for example) at time "t."

Based on the list of determined objects and corresponding attributes 330, a projection module 340 can determine a list of projected objects and corresponding attributes 350 within a scene that is projected in the future (i.e., a scene at time "t+n").

Downstream autonomous vehicle applications and controllers 360 can receive the list of projected objects/attributes (at time "t") 330 and the list of projected objects/attributes (at time "t+n") 350. The downstream applications and controllers 360 can use the received information to perform the necessary autonomous vehicle functions.

A validation device 370 can then receive imagery/sensory data 310 that corresponds to the actual scene at time "t+n." Based on this inputted imagery/sensory data 310 for time "t+n," the validation device 370 can determine whether the list of projected objects and corresponding attributes 350 correctly reflects the objects/attributes at time "t+n." If the validation device 370 indicates that the projected objects and corresponding attributes 350 do not accurately reflect the current scene, then the validation device 370 can also initiate re-detection/re-classification of objects in the scene. Validation device 370 can initiate a detection 380 of the objects of the scene, which can determine whether new objects have entered into the scene. The validation device can thus initiate the detection 380, which enables recalculation/revalidation of at least one region of interest that has newly appeared or that has changed.

As described above, detection of a new object within the scene can trigger a method to detect/classify object locations/characteristics. One or more embodiments can perform the original CNN computation for new objects that appear on the scene. For example, a new object can be a vehicle that approaches with a higher relative speed than estimated by the detecting vehicle; or the new object can be an existing vehicle that changes lane, or the new object can be a vehicle that was previously out of the view of the detecting vehicle.

As discussed above, by reducing the need to continually detect and to classify objects which have already been detected/classified, one or more embodiments can reduce a latency that is typically associated with performing object detection. One or more embodiments can reduce an amount of real-time computing that is needed to be performed on-board a vehicle, and thus one or more embodiments can enable certain computing to be performed using cloud computing.

For example, with one or more embodiments, the validation process that is performed by validation device 370 can be performed using cloud computing or can be performed by a device that is apart from the onboard processing system. Therefore, the processing devices and capabilities that are aboard the vehicle do not need to be used in performing the validation process. The cloud computing system (that is separate from the onboard processing system) can also continuously perform object detection and classification based on the inputted imagery/sensory data. By continuously performing object detection/classification, the cloud computing system of one more embodiments can perform the validation process.

Figure 4:
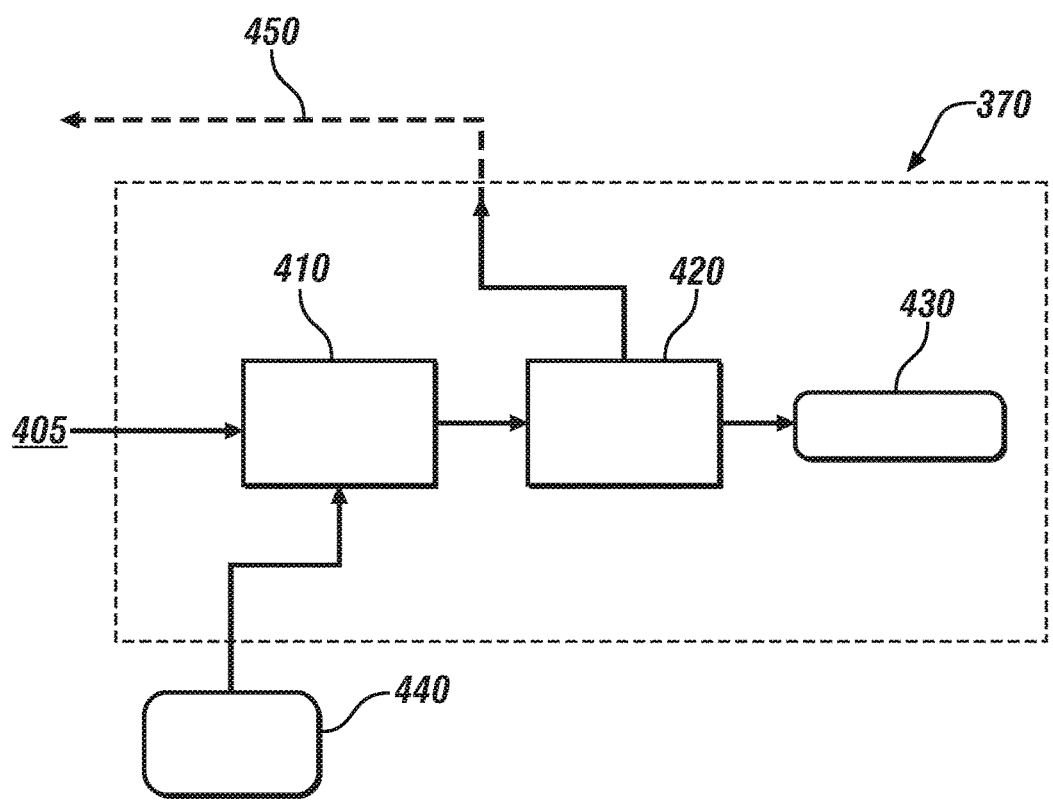
FIG. 4 illustrates an example validation and re-calculation process in accordance with one or more embodiments.

FIG. 4 illustrates an example validation and re-calculation process in accordance with one or more embodiments. Specifically, FIG. 4 illustrates an example process that is performed by validation device 370. At 410, validation device 370 can receive captured imagery 405 and can determine representative imagery based on a list of projected objects/attributes 440. At 410, validation device 370 can then compare the captured imagery 405 (which reflects the actual scene) against the representative imagery that is determined based on the list of projected objects/attributes 440 (which reflects an estimation of the actual scene). At 420, if the difference/error between the captured imagery 405 and the representative imagery is too large, then validation device 370 can trigger recalculation to re-detect and re-classify the objects of the scene at 450. On the other hand, if the difference/error between the captured imagery 405 and the representative imagery is within an acceptable threshold, then the estimation of the actual scene is determined to be correct/useable at 430.

Figure 5:
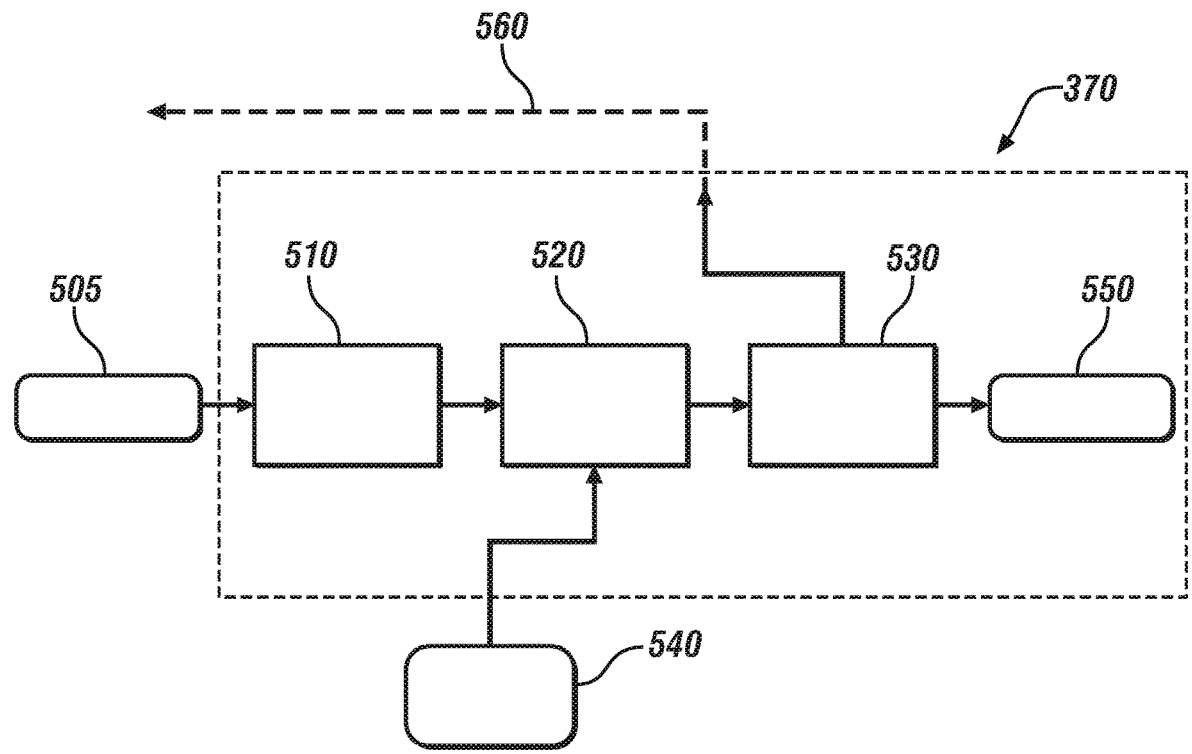
FIG. 5 illustrates another example validation and re-calculation process in accordance with one or more embodiments.

FIG. 5 illustrates another example validation and recalculation process in accordance with one or more embodiments. Specifically, FIG. 5 illustrates another example process that is performed by validation device 370. At 510, validation device 370 can receive captured radar and/or LIDAR data 505. At 510, validation device 370 can also process the received data in order to determine the objects that are within the current scene. At 520, validation device 370 can receive a list of projected objects/attributes 540 (i.e., the estimated objects/attributes within the scene). At 520, validation device 370 can then compare the objects that are determined based on the radar/LIDAR information (which reflects the actual scene) against the objects that are determined based on the projected objects/attributes 540 (which reflects an estimation of the actual scene). At 530, if the difference/error between the objects based on the radar/LIDAR information and the objects based on the projected objects/attributes is too large, then validation device 370 can trigger recalculation to re-detect and re-classify the objects of the scene at 560. On the other hand, if the difference/error is within an acceptable threshold, then the estimation of the actual scene is determined to be correct/useable at 550.

Figure 6:
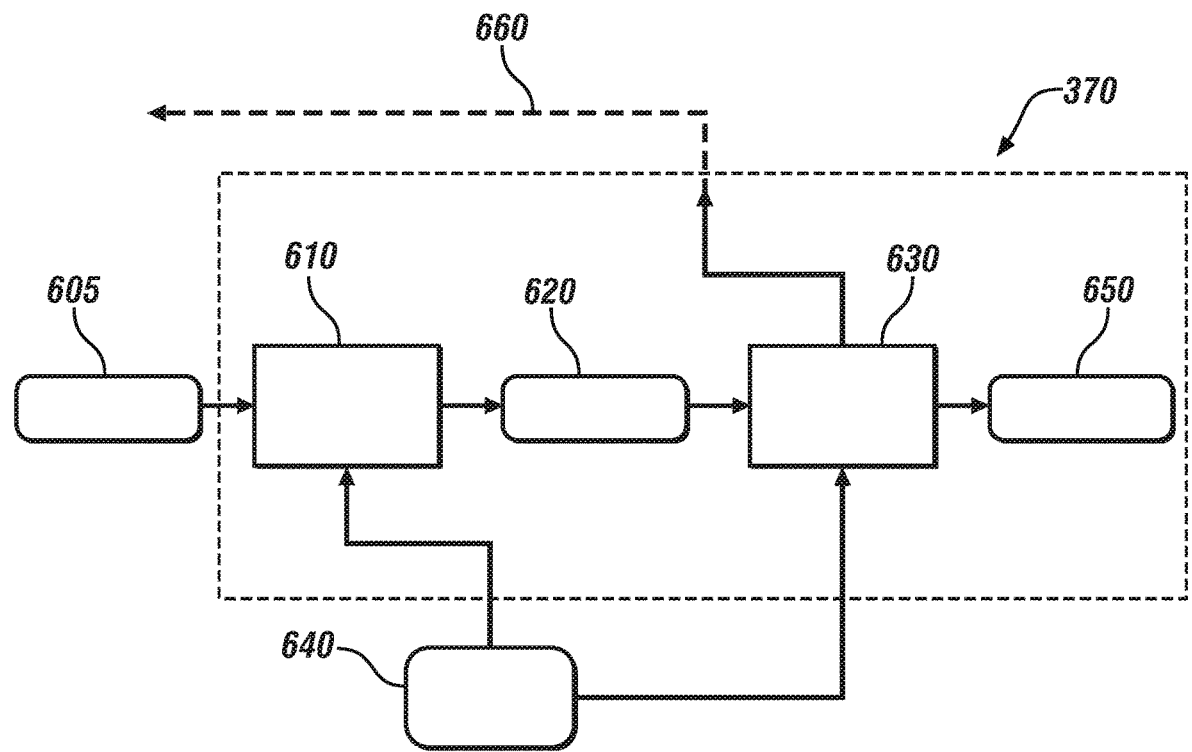
FIG. 6 illustrates another example validation and re-calculation process in accordance with one or more embodiments.

FIG. 6 illustrates another example validation and recalculation process in accordance with one or more embodiments. Specifically, FIG. 6 illustrates another example process that is performed by validation device 370. At 610, validation device 370 can receive captured video stream data 605. At 610, validation device 370 can also receive the list of projected objects/attributes 640 (i.e., the estimated objects/attributes within the scene). In the example of FIG. 6, some or all of the functionality of validation device 370 can be implemented by a cloud computing system. At 620, validation device 370 can generate a listing of objects and attributes based on the video imagery. At 620, validation device 370 can then compare the objects that are determined based on the video stream (which reflects the actual scene) against the objects that are determined based on the projected objects/attributes 640 (which reflects an estimation of the actual scene). At 630, if the difference/error between the objects based on the video stream and the objects based on the projected objects/attributes is too large, then validation device 370 can trigger recalculation to re-detect and re-classify the objects of the scene at 660. On the other hand, if the difference/error is within an acceptable threshold, then the estimation of the actual scene is determined to be correct/useable at 650.

With one or more embodiments, instead of continuously performing classification/detection of all objects within a scene, one or more embodiments can perform classification/detection of new objects that emerge on the scene. Specifically, one or more embodiments can reserve use of the high-frequency classifier/detector to perform detection and classification of one or more new objects.

As described above, after one or more objects have already been detected/classified, one or more embodiments can reduce the frequency of processing of these objects. The frequency of processing of these objects can be reduced because one or more embodiments only need to perform verification of the earlier projections.

Figure 7:
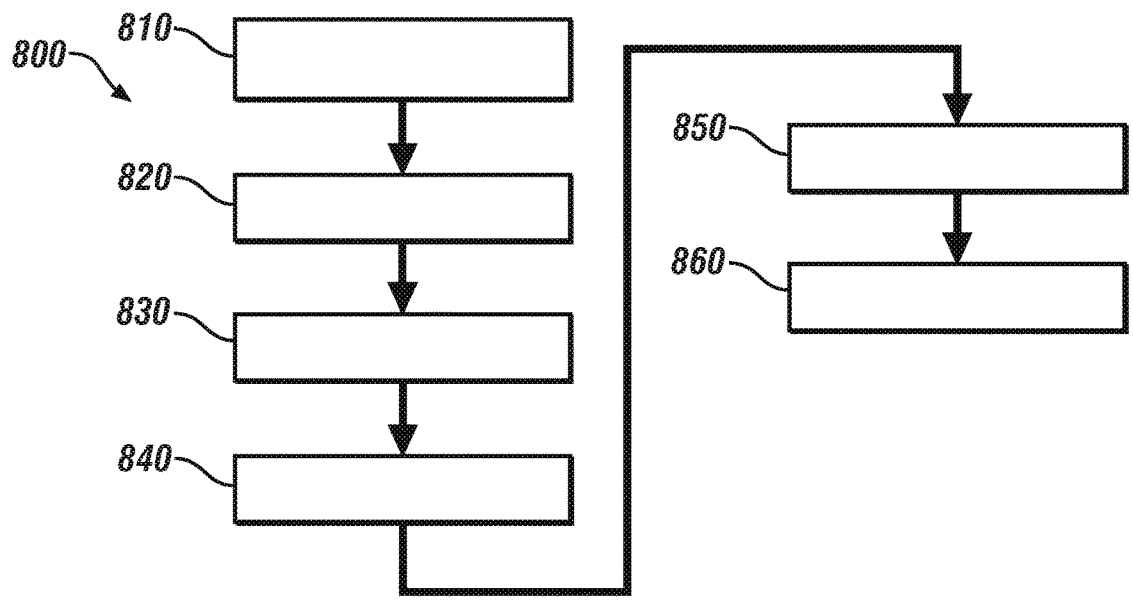
FIG. 7 depicts a flowchart of a method in accordance with one or more embodiments of the invention.

FIG. 7 depicts a flowchart of a method in accordance with one or more embodiments. The method of FIG. 7 can be performed in order to improve object detection and object classification by an autonomous vehicle. The method of FIG. 7 can be performed by a controller in conjunction with one or more vehicle sensors and/or camera devices. The controller can be implemented within an electronic control unit (ECU) of a vehicle, for example. The method of FIG. 7 can be performed by a vehicle controller that receives and processes imagery of a scene in which a vehicle is driven and then autonomously drives the vehicle based on the processing of the imagery. The method can include, at block 810, receiving, by a controller of an autonomous vehicle, a first data of a scene. The first data reflects the scene at a first time. The method can also include, at block 820, performing a first classification of at least one object within the scene based on the received first data. The method can also include, at block 830, determining a projected location of the at least one object. The projected location corresponds to an estimated location at a second time. The method can also include, at block 840, receiving a second data of the scene. The second data reflects the scene at the second time. The method can also include, at block 850, determining whether the projected location of the at least one object corresponds to the location of the at least one object as reflected by the second data. The method can also include, at block 860, determining whether performing of a second classification of the at least one object is necessary based on the determination of whether the projected location corresponds to the location of the at least one object as reflected by the second data.

Figure 8:
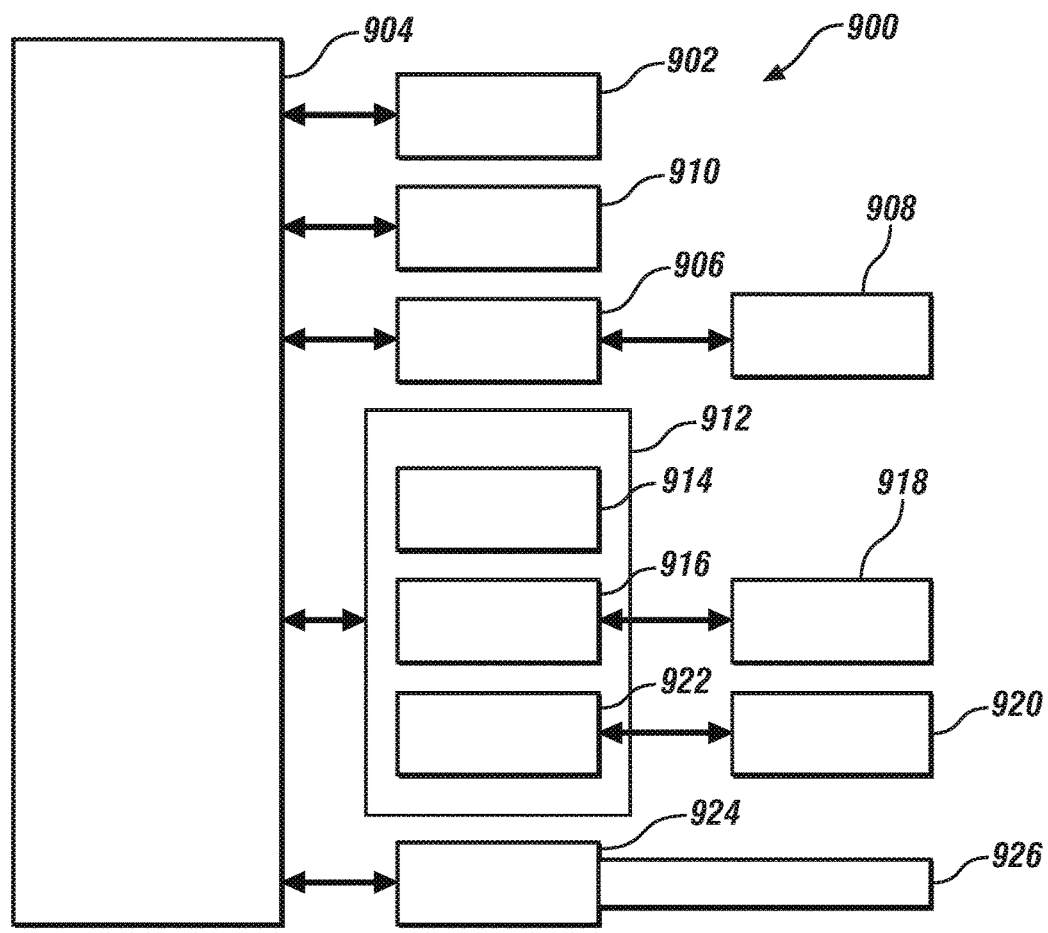
FIG. 8 depicts a high-level block diagram of a computer system, which can be used to implement one or more embodiments of the invention.

FIG. 8 depicts a high-level block diagram of a computing system 900, which can be used to implement one or more embodiments. Computing system 900 can correspond to, at least, a system that is configured to improving object detection and object classification, for example. The system can be a part of a system of electronics within a vehicle that operates in conjunction with a camera and/or a sensor. With one or more embodiments, computing system 900 can correspond to an electronic control unit (ECU) of a vehicle. Computing system 900 can be used to implement hardware components of systems capable of performing methods described herein. Although one exemplary computing system 900 is shown, computing system 900 includes a communication path 926, which connects computing system 900 to additional systems (not depicted). Computing system 900 and additional system are in communication via communication path 926, e.g., to communicate data between them.

Computing system 900 includes one or more processors, such as processor 902. Processor 902 is connected to a communication infrastructure 904 (e.g., a communications bus, cross-over bar, or network). Computing system 900 can include a display interface 906 that forwards graphics, textual content, and other data from communication infrastructure 904 (or from a frame buffer not shown) for display on a display unit 908. Computing system 900 also includes a main memory 910, preferably random access memory (RAM), and can also include a secondary memory 912. There also can be one or more disk drives 914 contained within secondary memory 912. Removable storage drive 916 reads from and/or writes to a removable storage unit 918. As will be appreciated, removable storage unit 918 includes a computer-readable medium having stored therein computer software and/or data.

In alternative embodiments, secondary memory 912 can include other similar means for allowing computer programs or other instructions to be loaded into the computing system. Such means can include, for example, a removable storage unit 920 and an interface 922.

In the present description, the terms "computer program medium," "computer usable medium," and "computer-readable medium" are used to refer to media such as main memory 910 and secondary memory 912, removable storage drive 916, and a disk installed in disk drive 914. Computer programs (also called computer control logic) are stored in main memory 910 and/or secondary memory 912. Computer programs also can be received via communications interface 924. Such computer programs, when run, enable the computing system to perform the features discussed herein. In particular, the computer programs, when run, enable processor 902 to perform the features of the computing system. Accordingly, such computer programs represent controllers of the computing system. Thus it can be seen from the forgoing detailed description that one or more embodiments provide technical benefits and advantages.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the embodiments not be limited to the particular embodiments disclosed, but will include all embodiments falling within the scope of the application.

What is claimed is:

1. A method, the method comprising:
receiving, by a controller of an autonomous vehicle, a first data of a scene, wherein the first data reflects the scene at a first time;
performing a first classification of at least one object within the scene based on the received first data;
determining a projected location of the at least one object, wherein the projected location corresponds to an estimated location at a second time;
receiving a second data of the scene, wherein the second data reflects the scene at the second time;
determining whether the projected location of the at least one object corresponds to the location of the at least one object as reflected by the second data; and
determining whether performing of a second classification of the at least one object is necessary based on the determination of whether the projected location corresponds to the location of the at least one object as reflected by the second data.

2. The method of claim 1, wherein the performing of the second classification of the at least one object is not necessary if the projected location corresponds to the location of the at least one object as reflected by the second data.

3. The method of claim 1, further comprising determining attribute data for the at least one classified object.

4. The method of claim 3, wherein determining the projected location of the at least one object comprises determining the projected location based on the attribute data.

5. The method of claim 3, wherein the attribute data comprises a heading and a speed of the object.

6. The method of claim 1, wherein performing the first classification of the at least one object comprises determining a region of interest within the received first data.

7. The method of claim 1, wherein receiving the first data comprises receiving video information or camera information of the scene.

8. The method of claim 1, wherein performing the first classification comprises performing the first classification by a convolutional neural network.

9. The method of claim 1, further comprising determining whether a new object has entered the scene.

10. The method of claim 9, further comprising determining that additional classification is necessary based on the determination of whether a new object has entered the scene.

11. A system within an autonomous vehicle, comprising:
an electronic controller of the vehicle configured to:
receive a first data of a scene, wherein the first data reflects the scene at a first time;
perform a first classification of at least one object within the scene based on the received first data;
determine a projected location of the at least one object, wherein the projected location corresponds to an estimated location at a second time;
receive a second data of the scene, wherein the second data reflects the scene at the second time;
determine whether the projected location of the at least one object corresponds to the location of the at least one object as reflected by the second data; and
determine whether performing of a second classification of the at least one object is necessary based on the determination of whether the projected location corresponds to the location of the at least one object as reflected by the second data.

12. The system of claim 11, wherein the performing of the second classification of the at least one object is not necessary if the projected location corresponds to the location of the at least one object as reflected by the second data.

13. The system of claim 11, wherein the electronic controller is further configured to determine attribute data for the at least one classified object.

14. The system of claim 13, wherein determining the projected location of the at least one object comprises determining the projected location based on the attribute data.

15. The system of claim 13, wherein the attribute data comprises a heading and a speed of the object.

16. The system of claim 11, wherein performing the first classification of the at least one object comprises determining a region of interest within the received first data.

17. The system of claim 11, wherein receiving the first data comprises receiving video information or camera information of the scene.

18. The system of claim 11, wherein performing the first classification comprises performing the first classification by a convolutional neural network.

19. The system of claim 11, wherein the electronic controller is further configured to determine whether a new object has entered the scene.

20. The system of claim 19, wherein the electronic controller is further configured to determine that additional classification is necessary based on the determination of whether a new object has entered the scene.

* * * * *